United States Patent [19]
Grainger

[11] Patent Number: 5,303,992
[45] Date of Patent: Apr. 19, 1994

[54] EXTENDABLE AND RETRACTABLE GROUND-ENGAGING PROJECTIONS FOR TRACKED VEHICLE

[75] Inventor: Guy B. Grainger, Huntsville, Ala.

[73] Assignee: Teledyne Industries, Inc., Huntsville, Ala.

[21] Appl. No.: 922,790

[22] Filed: Jul. 31, 1992

[51] Int. Cl.⁵ ............................................. B62D 55/26
[52] U.S. Cl. ..................................... 305/46; 305/24; 305/56; 305/60; 301/47
[58] Field of Search ............... 305/24, 39, 46, 54, 305/55, 56, 57, 60; 301/45, 47; 180/9.26

[56] References Cited

U.S. PATENT DOCUMENTS

| | | |
|---|---|---|
| 1,301,554 | 4/1919 | Good . |
| 1,450,626 | 4/1923 | Atwood . |
| 2,007,853 | 7/1935 | Fuss . |
| 2,294,409 | 9/1942 | Kohn . |
| 2,765,199 | 10/1956 | Partin ........................ 301/47 |
| 3,018,837 | 1/1962 | Chauvin ..................... 301/47 X |
| 3,063,401 | 11/1962 | Patee . |
| 3,239,277 | 3/1966 | Beck ........................... 301/47 |
| 4,154,488 | 5/1979 | Svensson et al. . |
| 4,810,043 | 3/1989 | McIntosh . |
| 5,078,326 | 1/1992 | Wright ........................ 305/56 X |

FOREIGN PATENT DOCUMENTS

| | | | |
|---|---|---|---|
| 1232554 | 5/1986 | U.S.S.R. ................ 305/46 |
| 1461680 | 2/1989 | U.S.S.R. ................ 305/24 |
| 536780 | 5/1941 | United Kingdom ...... 305/46 |

*Primary Examiner*—Russell D. Stormer
*Attorney, Agent, or Firm*—Dickstein Shapiro Morin

[57] ABSTRACT

An armored tracked vehicle is provided with traction-increasing grousers and a remotely controllable system for extending and retracting the grousers. In a preferred embodiment of the invention, the grousers are extended by a hydraulic system formed of a plurality of radially arrayed pistons and cylinders. Conduits for the hydraulic system are located in protected positions within the vehicle's wheel axles. Preferably, the grousers are retracted in the absence of hydraulic pressure by springs located in each cylinder. Further, the grousers are arranged to align the track with respect to the wheels. This way, the track does not have to have a heavy center alignment guide.

22 Claims, 3 Drawing Sheets

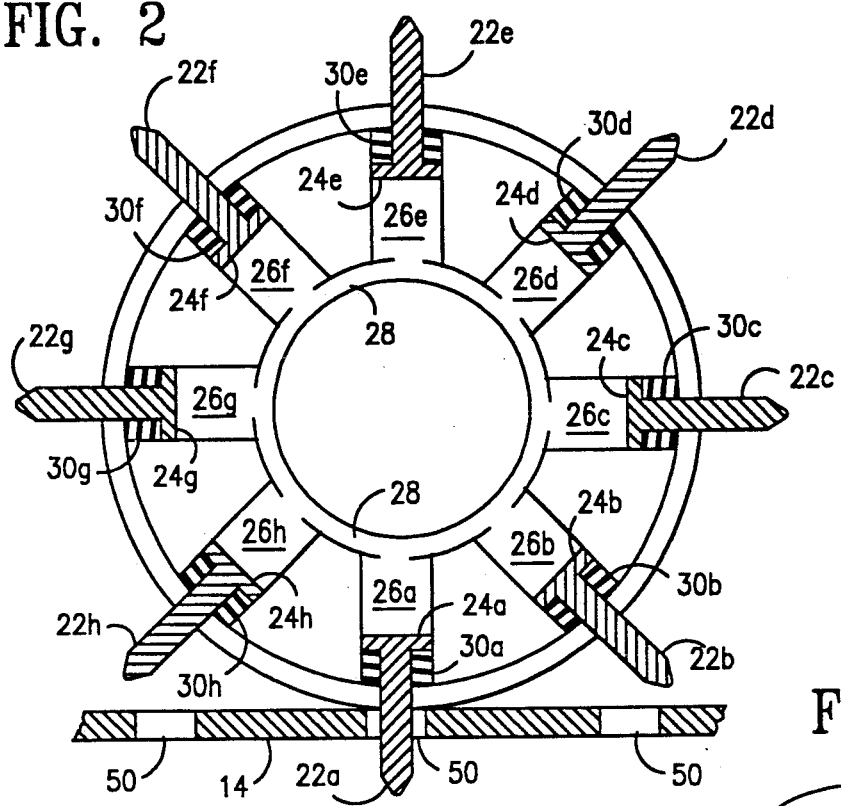
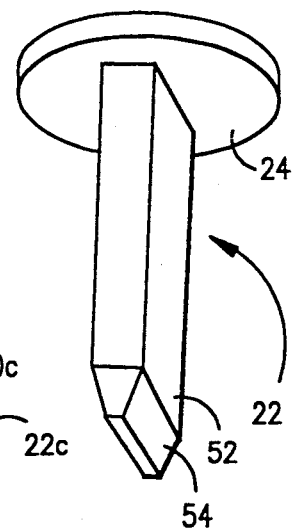
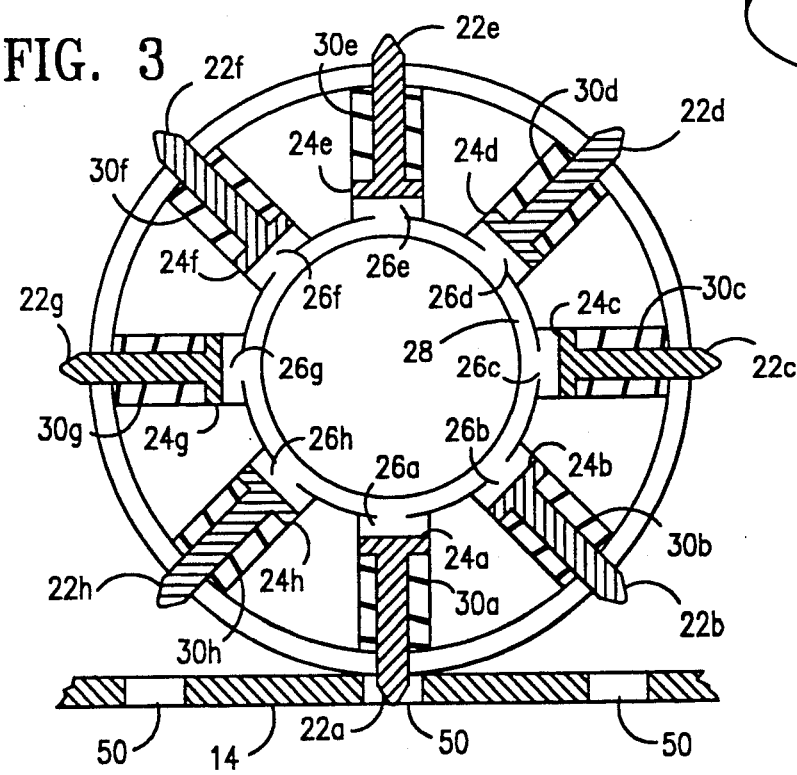

EXTENDABLE AND RETRACTABLE GROUND-ENGAGING PROJECTIONS FOR TRACKED VEHICLE

BACKGROUND OF THE INVENTION

The present invention relates generally to tracks for tracked vehicles and more particularly to a grouser system for increasing the traction of a tracked vehicle.

It is known to provide tracked military vehicles (such as tanks and earth moving vehicles) with grousers to increase traction. However, such grousers are conventionally provided as separate elements that have to be individually connected to the track. Connecting individual grousers to a track and individually removing the grousers are time consuming procedures. Moreover, the known grousers generally cannot be safely used in a combat situation, where the vehicle operator cannot leave the armored compartment of the military vehicle without being exposed to hostile fire.

Accordingly, there is a need in the art for a military tracked vehicle with grousers that can be conveniently extended and retracted from within the armored operator's compartment.

U.S. Pat. No. 4,154,488 to Svensson discloses a vehicle for use in forestry. The vehicle has a rubber track which is driven by teeth which extend radially outwardly from a wheel. Extendable grousers are held within the teeth. When the grousers are extended, they pass through gaps defined within the track. The grousers are pushed radially outwardly through the teeth by a pressure ring actuated by a remotely controlled hydraulic cylinder. Svensson's pressure ring system is complicated and would be uneconomical to manufacture.

Accordingly, there is a need in the art for an economical tracked vehicle with grousers that can be reliably extended and retracted.

SUMMARY OF THE INVENTION

The present invention alleviates to a great extent the disadvantages of the known systems by providing an armored tracked vehicle with grousers for increasing traction, and operating means for extending the grousers through the track, with the operating means being operable from within the armored vehicle.

In a preferred embodiment of the invention, the grousers are extended by a hydraulic system formed of a plurality of radially arrayed pistons and cylinders. Preferably, the hydraulic system includes conduits that are located in protected positions within the vehicle's wheel axles.

Preferably, the grousers are retracted by reduction of the hydraulic fluid pressure and application of forces provided by springs located in each cylinder to force the grousers back into the cylinders. Thus, the grousers are preferably controlled by a "fail-safe" system, with the springs being used to retract the grousers in the event that hydraulic pressure is lost.

In another aspect of the invention, the grousers perform the function of aligning the track. This way, the track does not have to have a center alignment guide.

An object of the present invention is to provide an armored vehicle with remotely controlled extendable and retractable grousers.

Another object of the invention is to provide a vehicle with grousers which are reliably and efficiently extendable and retractable, and with the vehicle being economical to manufacture.

Other objects and advantages of the present invention will become apparent from the following detailed description and drawings which illustrate preferred embodiments of the present invention.

BRIEF DESCRIPTION OF THE DRAWINGS

FIG. 2 is a schematic cross sectional view of a wheel for the vehicle of FIG. 1, grousers for the wheel, hydraulic means for extending the grousers, and springs for retracting the grousers in the absence of hydraulic fluid pressure.

FIG. 3 is a view like FIG. 2, but with the grousers in retracted positions.

FIG. 7 is a perspective view of a grouser for the vehicle of FIG. 1.

DETAILED DESCRIPTION OF PREFERRED EMBODIMENTS

Figure 1:
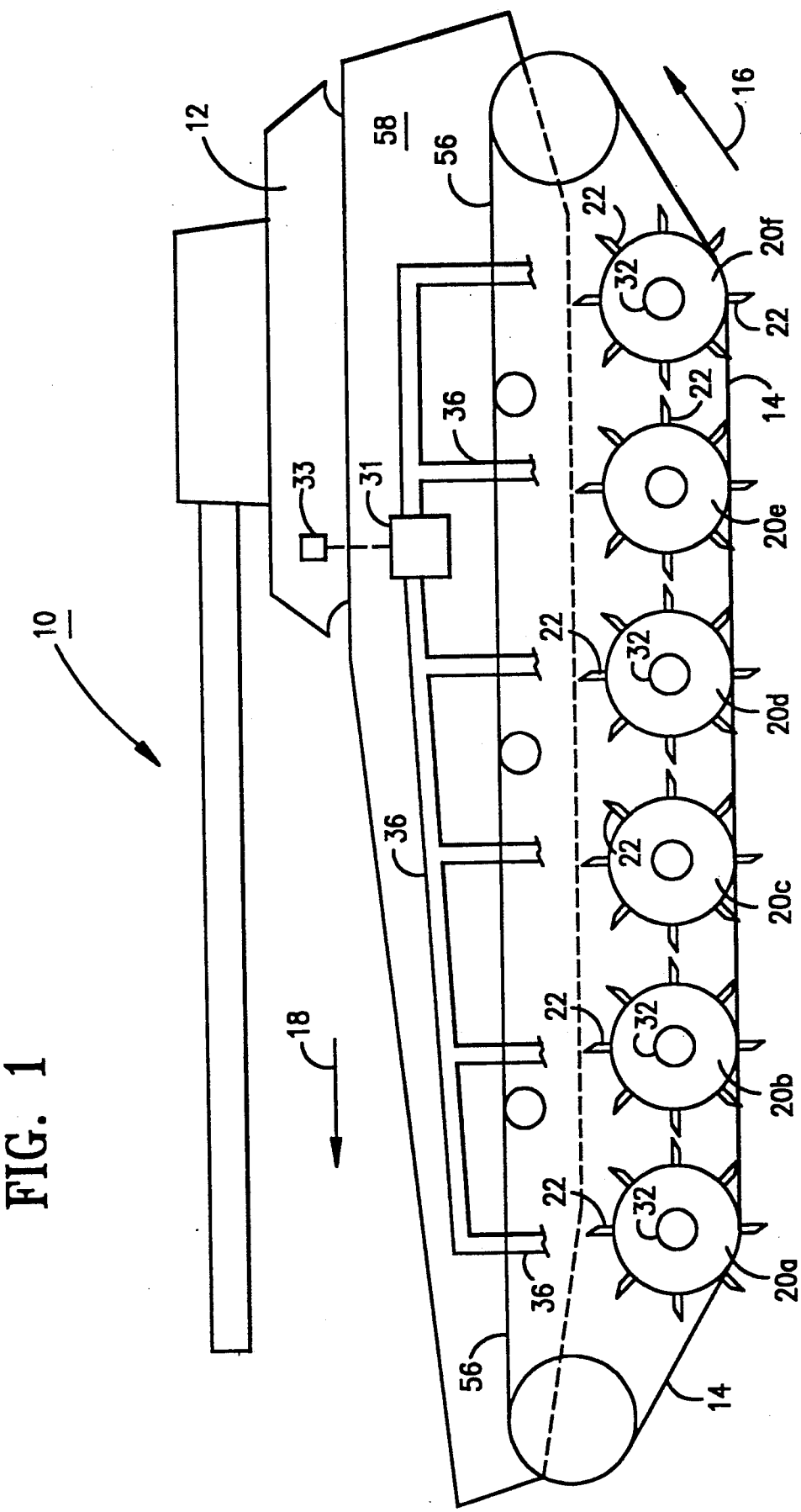
FIG. 1 is a schematic side view of a military tracked vehicle constructed in accordance with a preferred embodiment of the present invention.

Referring now to the drawings, there is shown in FIG. 1 an armored vehicle 10 for use in a combat zone. The vehicle 10 has a protective armored operator's compartment 12, an endless track 14, a motor (not shown) for rotating the track 14 in the direction of the arrow 16 to move the vehicle 10 in the direction of the arrow 18, wheels 20a, 20b, 20c, 20d, 20e, 20f for supporting the vehicle 10, and grousers 22 for increasing the traction of the vehicle 10 and for aligning the track 14 with respect to the wheels 20. Advantageously, the operator of the vehicle 10 can extend and retract the grousers 22 without leaving the safety of the operator's compartment 12.

As illustrated in detail in FIGS. 2 and 3, there are eight radially arranged grousers 22a, 22b, 22c, 22d, 22e, 22f, 22g, 22h for each wheel 20. The grousers 22 are shown in fully extended traction-increasing positions in FIG. 2, and in fully retracted positions in FIG. 3. When fully extended, the grousers 22 extend outwardly through the track 14 as illustrated in FIGS. 1 and 2 to increase traction. When fully retracted (FIG. 3), the grousers 22 will not extend outwardly through the track 14, such that the vehicle 10 can move at high speeds on a hard surface, and such that the vehicle 10 will not damage paved surfaces, or the like. However, the grousers 22 always perform the function of aligning the track 14 with respect to the wheels 20, even when the grousers 22 are fully retracted, as explained further below.

The radially arranged grousers 22 are advantageously extended by a hydraulic (or pneumatic) system formed of pistons 24a, 24b, 24c, 24d, 24e, 24f, 24g, 24h and cylinders 26a, 26b, 26c, 26d, 26e, 26f, 26g, 26h, and a hydraulic fluid conduit 28. The pistons 24 slide within the cylinders 26, and may be integrally connected to the respective grousers 22. Thus, to simultaneously move the grousers 22 from the retracted positions (FIG. 3) to the extended positions (FIG. 2), pressurized hydraulic fluid is supplied to the radially inner ends of the cylinders 26 by the hydraulic fluid conduit 28, and the forces developed by the hydraulic fluid pressure against pistons 24 overcome the resistive forces applied to the pistons 24 by the springs 30. The springs 30 are compressed as the grousers 22 are extended.

To move the grousers 22 from the extended positions (FIG. 2) to the retracted positions (FIG. 3), pressurized hydraulic fluid is drained from the cylinders 26 through the outer hydraulic fluid conduit 28, while the springs 30 apply the necessary forces to retract the grousers 22. The supply and return of hydraulic fluid to and from the conduit 28 is controlled by a hydraulic fluid pressure control system 31 (FIG. 2) which can be operated from a console 33 located inside the operator's compartment 12. Thus, all of the grousers 22 for the entire vehicle 10 can be operated by a single hydraulic control system.

In a preferred embodiment of the invention, the hydraulic control system 31 may be operated to adjustably position the grousers 22 at intermediate positions between the positions shown in FIGS. 2 and 3. That is, the system 31 may be capable of controlling the supply of hydraulic fluid within conduits 28 such that the pistons 24 are controllably maintained at positions between the positions shown in FIGS. 2 and 3.

Figure 4:
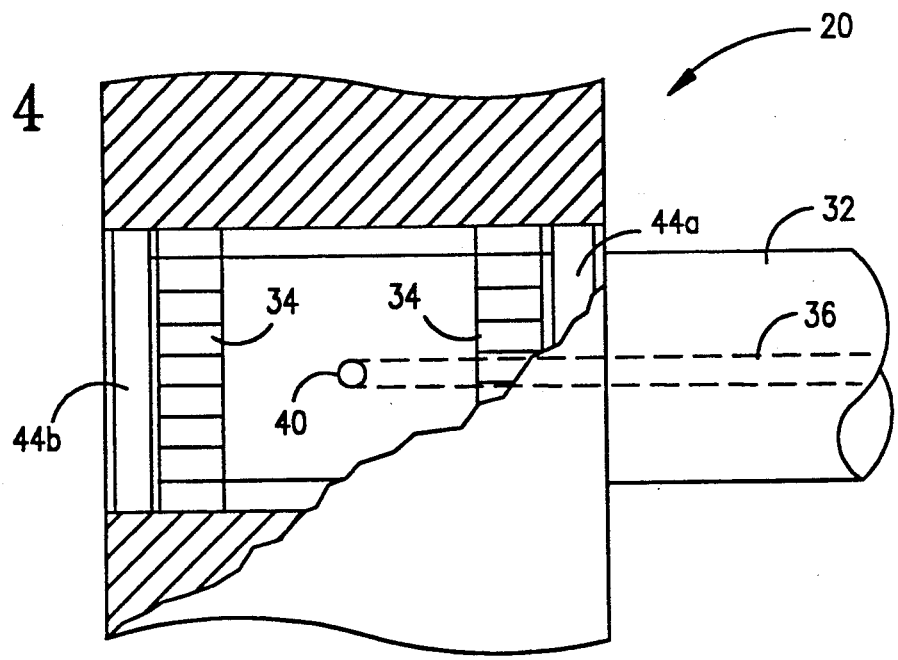
FIG. 4 is a partially cutaway top view of a wheel for the vehicle of FIG. 1, an axle, and means for supplying hydraulic fluid.

Each wheel 20 is connected to the vehicle 10 by an axle 32. As illustrated in FIG. 4, the wheel 20 is preferably freely rotatable with respect to the axle 32, with roller bearings 34 being provided between the wheel 20 and the axle 32. Thus, in the preferred embodiment, the wheel 20 and the grousers 22 are driven by the track 14.

Hydraulic fluid is communicated from the control system 31 to the conduit 28 through the wheel axle 32 by conduit 36 which extends from the control system 31 and which extends axially within the axle 32. The conduit 36 is connected to the conduit 28 by a radial opening 40. The fluid is contained within the wheel 20 by annular seals 44a, 44c. Locating the conduit 36 within the axle 32 is an economical way to provide a protected source of hydraulic fluid communication between the control system 31 and the cylinders 26. In the preferred embodiment, there are no exposed hoses that could be ruptured by explosion, shrapnel or fire.

Figure 5:
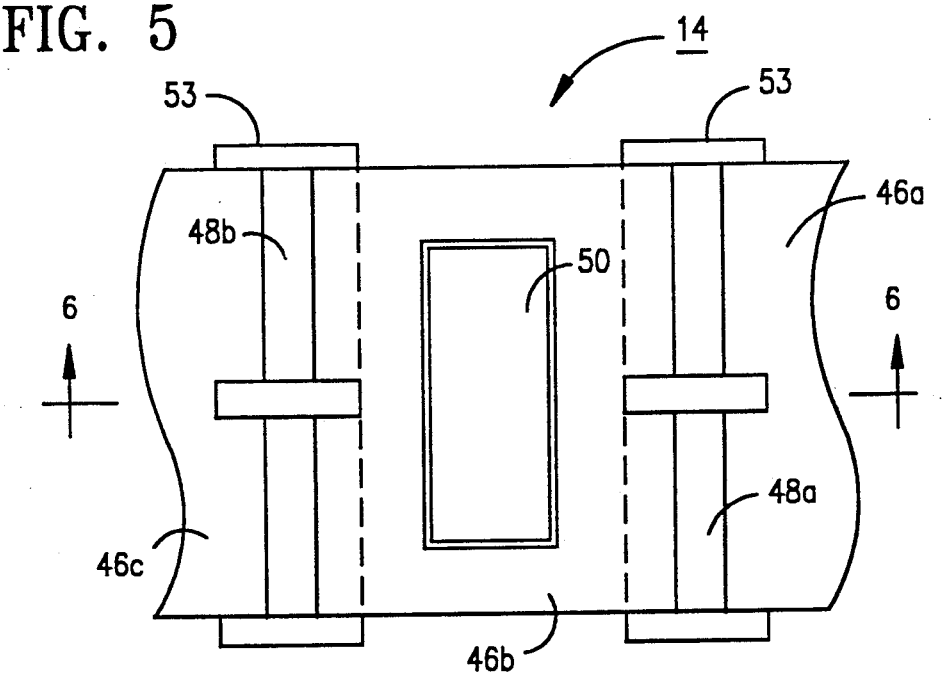
FIG. 5 is a partial top view of a track for the vehicle of FIG. 1.

Referring now to FIG. 5, the track 14 is formed of an endless series of metal surface blocks 46a, 46b, 46c, etc., connected to each other by links 48a, 48b, etc. In the center of each block 46 there is a rectangular slot 50 for meshing with the grousers 22. The track 14 is lighter than conventional tracks since it does not have a conventional center alignment guide. A center guide is not needed with the present invention since the track 14 is always aligned with respect to the wheels 20 by the grousers 22. Cutting the rectangular slot 50 into the track block 46 also reduces the total weight of the track block 46.

Figure 6:
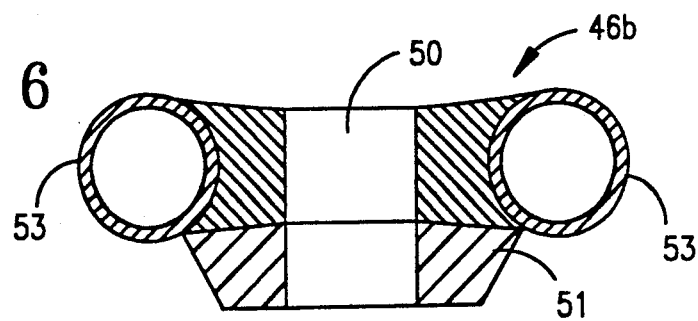
FIG. 6 is a partial cross sectional side view along the line 6—6 of FIG. 5.

As illustrated in FIG. 6, a rubber pad 51 is preferably attached to the surface of each metal track block 46. The rubber pad 51 (which contacts the ground or road) is supported by the underlying metal block 46. Steel tubes 53 are welded to the ends of the blocks 46. The steel tubes 53 allow the blocks 46a, 46b, 46c, etc. to be pinned together to form the endless track.

In an alternative embodiment of the invention, the track may be formed of side-by-side track blocks, with a grouser slot 50 being located in each track block. In this alternative embodiment, pairs of side-by-side grousers 22 extend into the side-by-side slots.

As illustrated in FIG. 7, each grouser 22 has an elongated body 52 with a pointed tip 54. The length of the grouser 22 is such that the pointed tip 54 extends through the track slots 50 sufficiently far enough to increase traction when the grousers 22 are in their extended position. Yet the tip 54 should not extend outwardly beyond the slots 50 when the grousers 22 are in their fully retracted positions. Further, the grouser 22 is long enough to always remain in contact with the slot 50 to always align the track 14 with respect to the wheels 20.

The grouser tip 54 may be pointed so as to more easily penetrate into soil. Further, the grouser body 52 has a rectangular cross section to match the rectangular slot 50. This way, the grousers 22 mesh with the slots 50 such that soil does not build up on the grousers 22. If soil were to build up and become caked on the grousers 22, this would reduce traction generation efficiency.

The present invention is particularly advantageous in connection with vehicles that do not provide enough room to accommodate large grousers. An example of such a vehicle is the M1 tank. With the present invention, as illustrated in FIG. 1, no head space is required between the top portion 56 of the endless track 14 and the vehicle chassis 58. This is because the grousers 22 remain with the wheels 20, beneath the track top portion 56. Thus, with the present invention, the vehicle 10 can have a low profile.

The above description and drawings are only illustrative of preferred embodiments which achieve the objects, features and advantages of the present invention, and it is not intended that the present invention be limited thereto. Any modification to the present invention coming within the spirit and scope of the following claims is to be considered part of the present invention.

What is claimed as new and desired to be protected by letters patent of the United States is:

1. An armored vehicle, comprising:
   an endless track;
   a wheel for supporting said vehicle, said wheel having an axis of rotation, and said wheel including grousers for increasing the traction of said armored vehicle; and
   operating means for extending said grouser away from said axis of said wheel and through said track and for retracting said grousers toward said axis of said wheel, said operating means being operable from within said armored vehicle.

2. The armored vehicle of claim 1, wherein said track has slots, and wherein said grousers are arranged to align said track with respect to said wheel.

3. The armored vehicle of claim 1, wherein said operating means includes a hydraulic system formed of pistons and cylinders, with said pistons being connected to said grousers, and means for supplying hydraulic fluid to said cylinders.

4. The armored vehicle of claim 3, further comprising an axle for supporting said wheel, and wherein said hydraulic fluid supplying means is located within said axle.

5. The armored vehicle of claim 1, wherein said vehicle has an armored operator's compartment, said operating means being operable from within said armored operator's compartment.

6. A vehicle, comprising:
   an endless track;
   a first wheel for supporting said vehicle with respect to said track, said wheel having an axis of rotation, and said wheel including first grousers for increasing the traction of said vehicle and for aligning said track with respect to said wheel; and operating means for extending said grousers away from said axis of said wheel and for retracting said grousers toward said axis of said wheel, said operating means being operable from within said vehicle; and wherein said track has a plurality of slots for receiving said grousers, and wherein said grousers and said slots are arranged such that said grousers are received within said slots to thereby align said track with respect to said wheel even when said grousers are retracted.

7. The vehicle of claim 6, wherein said track is formed of metal.

8. The vehicle of claim 6, wherein said track has no center guide for aligning said track with respect to said wheel.

9. The vehicle of claim 8, wherein said grousers move in and out of said slots during operation of said vehicle, whereby soil is prevented from building up on said grousers.

10. The vehicle of claim 6, further comprising a second wheel, said second wheel including radially arranged second grousers, and wherein said operating means is arranged to extend said second grousers and to retract said second grousers.

11. The vehicle of claim 10, wherein said operating means includes a hydraulic system formed of pistons and cylinders, with a first plurality of said pistons being connected to said first grousers and with a second plurality of said pistons being connected to said second grousers, and means for supplying hydraulic fluid to said cylinders.

12. The vehicle of claim 11, wherein said vehicle is an armored military vehicle.

13. The vehicle of claim 6, further comprising means for rotating said track, and wherein said wheel and said grousers are rotated by said track.

14. A vehicle, comprising:
an endless track;
a wheel for supporting said vehicle with respect to said track, said wheel having an axis of rotation, and said wheel including grousers for increasing the traction of said vehicle; and
a hydraulic system for extending said grousers away from said axis of said wheel and through said track, and springs for retracting said grousers toward said axis of said wheel, said hydraulic system being formed of pistons and cylinders, with said pistons being connected to said grousers, and means for supplying hydraulic fluid to said cylinders.

15. The vehicle of claim 14, further comprising an axle for supporting said wheel, and wherein said hydraulic fluid supplying means is located within said axle.

16. The vehicle of claim 15, wherein said cylinders are located within said wheel, and wherein said cylinders are radially arranged around said axle.

17. The vehicle of claim 16, wherein said grousers are integrally connected to said pistons.

18. The vehicle of claim 17, wherein said vehicle is a military vehicle with an armored operator's compartment, said hydraulic system being operable from within said armored operator's compartment.

19. A method of operating an armored vehicle in a combat zone, wherein said vehicle includes an endless track, a wheel for supporting said vehicle, said wheel having an axis of rotation, and said wheel including grousers for increasing the traction of said vehicle, and operating means for extending said grousers and for retracting said grousers, said method comprising the steps of:
moving said vehicle through said combat zone; and
without leaving said combat zone, increasing the traction of said armored vehicle by extending said grousers away from said axis of said wheel and through said track.

20. The method of claim 19, wherein said operating means includes a hydraulic system, and wherein said step of extending said grousers through said track includes the step of actuating said hydraulic system from within an armored operator's compartment.

21. The method of claim 19, further comprising the step of retracting said grousers toward said axis of said wheel, and subsequently operating said vehicle at a high speed on a hard surface.

22. The method of claim 19, wherein said vehicle is a tank.

* * * * *